3,087,962
PROCESS OF MAKING ESTERS OF ACRYLIC AND METHACRYLIC ACIDS
Newman M. Bortnick, Oreland, Pa., assignor to Rohm & Haas Company, Philadelphia, Pa., a corporation of Delaware
No Drawing. Filed Jan. 21, 1960, Ser. No. 3,730
6 Claims. (Cl. 260—486)

This invention deals with a method for the preparation of esters by the reaction of an acrylic or methacrylic acid with an olefinically unsaturated compound containing two substituent groups on one of the carbon atoms of the double bond. The present process is characterized by high yields and predictability of result. Although similar processes are known in which saturated aliphatic acids and aromatic acids are reacted with similar olefinic compounds, application of the reaction to the present acids to give the economically important acrylic and methacrylic esters seems to have been deterred because of the possibility of polymerization and additive side reactions. Surprisingly, no such side reactions are met with under the defined conditions of operation.

The present reaction may be carried out at room temperature but it is preferred to conduct the reaction in the range of 0° to 50° C. The reaction may be run at atmospheric pressure but it is often advantageous to conduct the process under slightly increased pressure, such as up to about ten atmospheres if the olefin in question is normally a gas at the temperature of reaction.

The present process is conducted in the presence of a strong acid catalyst, such as sulfuric acid, or of a Lewis acid, such as boron trifluoride. While the catalyst may be employed in a wide range of concentrations, it is convenient to use about 2 to 15 mole percent with respect to the methacrylic or acrylic acid employed.

It is permissible in conducting the process of this invention to add the olefin to the acid or the acid to the olefin or mix them together substantially simultaneously. Comparable results are obtained in all instances and it is largely a matter of convenience with regard to how the reactants are brought together. It is frequently advantageous to add the olefin to the acid when the olefin is a gas under normal atmospheric conditions, but this is not a restrictive consideration. While a solvent is not required in the present instance, one may be employed if so desired but no outstanding advantages are observed from the use of the solvent. Such solvents may be alkanes, polyolefins, ethers, dioxane, and the like. It is sometimes preferable to use an excess of the olefin in these reactions, although this is not necessary, and the olefin can be in deficiency.

By strictly adhering to the above reaction conditions, one skilled in the art is able to obtain repeatedly a desired ester product in high yields substantially free from reaction complexities. It is to be noted in this respect that commercially obtainable supplies of olefins may be employed as long as the olefins contains two substituent groups on one of the carbon atoms of the double bond. This means that frequently such olefins may be employed even through they are supplied commercially with appreciable amounts of other components, such as alkanes and other alkenes outside the scope of the reactive compounds herein defined.

Suitable for use as the olefinically unsaturated compound are compounds of the general structure:

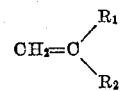

where $R_1$ and $R_2$ are alkyl groups totalling no more than eight carbon atoms, or when taken together with the carbon atom joining them, form a carbocycle with six carbon atoms in the ring. The carbocycle may be appropriately substituted to contain a total of eight carbon atoms, the other two atoms being provided by two methyl groups, an ethyl group, or an ethylene bridge.

Examples of such compounds are isobutylene, 2-methyl-1-butene, 2-methyl-1-hexene, 2-ethyl-1-pentene, methylenecyclohexane, 1 - methylene - 3,4 - dimethylcyclohexane, 1-methylene-4-ethylcyclohexane, camphene, and the like.

The reaction proceeds to the formation of the desired ester without affecting the double bond of the acid reactant either in polymerizations or other side reactions, as long as the above teachings are adhered to. The ester product obtained is usually an acrylic or methacrylic ester of a tertiary alcohol corresponding to the olefin reactant employed. For instance, with 2-methyl-1-butene as the olefin reactant, the product is tert-pentyl acrylate or methacrylate depending on the acid employed. Similarly, there is formed tert-butyl, tert-hexyl, tert-octyl, and tert-decyl acrylate or methacrylate. It is interesting to note that when camphene is the olefin reactant, a rearrangement in the molecule occurs during the reaction and the product obtained is isobornyl acrylate or methacrylate. This is entirely satisfactory for the present purpose, although the rearrangement is unique in the present instance.

The present invention may be more fully understood from the following examples which are offered by way of illustration and not by way of limitation. Parts by weight are used throughout.

*Example 1*

Into a stainless steel autoclave is charged 516 parts of methacrylic acid, 1 part of hydroquinone, and 17 parts of aqueous 98% sulfuric acid. The mixture is cooled to 18° C. Liquid isobutylene is charged onto the surface of this mixture with good stirring, 336 parts being added over a period of one hour. The reaction mixture is maintained at 25° C. over a period of five hours, with cooling as needed. At the end of this time, it is cooled to 16° C. and 150 parts of a 16⅔% solution of sodium hydroxide in water is fed in over a period of ten minutes under pressure. The autoclave is then vented of excess isobutylene, and the temperature raised to 50° C. to complete the removal of isobutylene. To the contents of the autoclave are then added 600 parts of 16⅔% sodium hydroxide solution. The mixture is allowed to separate into two layers, and the upper layer is disilled through an efficient fractionating column. After a forerun, which consists of tert-butanol and diisobutylene, there is obtained 430 parts of pure tertiary butyl methacrylate boiling at 60° to 61° C. at 50 mm. of Hg and having a refractive index of 1.411–1.412 at 25° C.

In exactly the same way, from 432 parts of acrylic acid, 1 part of hydroquinone, 17 parts of 98% sulfuric acid, and 336 parts of isobutylene, there is prepared 400 parts of tert-butyl acrylate, boiling at 48°–49° C. at 60 mm. of Hg, with a refractive index of about 1.4075.

*Example 2*

To a 3-necked flask is charged 258 parts of methacrylic acid, 6.3 parts of boron trifluoride and 0.6 part of N,N'-diphenylparaphenylene diamine. To this is added 408 parts of camphene maintained in a molten condition. The temperature rises to about 50° C., and is maintained there by cooling. In one to two hours, the reaction has reached equilibrium, as indicated by constant refractive index, $n_D^{25}=1.471$.

The mixture is then cooled to 0° C., and held at that temperature for one hour. It is then washed with 10% sodium hydroxide solution, and the organic layer is distilled in the presence of an additional 3 parts of N,N'-diphenylparaphenylene diamine. After removal of foreruns, there is obtained 550 parts of isobornyl methacrylate, boiling at 113°–120° C. at 6 mm. of Hg. This compound has an $n_D^{25}$ of about 1.4747, and a saponification number of about 252. It polymerizes rapidly in the presence of benzoyl peroxide or azodiisobutyronitrile at 60° C. to a hard, colorless brittle polymer.

In the same way, from 216 parts of acrylic acid, 408 parts of camphene, 4.5 parts of boron trifluoride and 0.6 parts of N,N'-diphenylparaphenylene diamine, there is obtained 442 parts of isobornyl acrylate, which distills at 104°–106° C. at 4.5 mm. of Hg, has an $n_D^{25}$ of about 1.474 and a saponification number of 268. It polymerizes equally well in the presence of the common polymerization initiators.

I claim:
1. A process for the production of monoesters which comprises reacting a compound having the formula

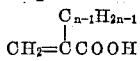

in which $n$ is an integer of one to two and a compound having the formula

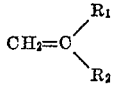

in which $R_1$ and $R_2$ are alkyl groups totalling from two to eight carbon atoms at a temperature of about 0° to 50° C. in the presence of a strong acid catalyst selected from the group consisting of sulfuric acid and boron trifluoride.

2. A method according to claim 1 in which the strong acid catalyst is sulfuric acid.

3. A method according to claim 1 in which the acid reactant is methacrylic acid.

4. A method for the production of tert-butyl methacrylate which comprises reacting isobutylene with methacrylic acid at a temperature of about 0° to 50° C. in the presence of sulfuric acid.

5. A method for the preparation of isobornyl methacrylate which comprises reacting camphene with methacrylic acid at a temperature of about 0° to 50° C. in the presence of boron trifluoride.

6. A method for the preparation of isobornyl acrylate which comprises reacting camphene with acrylic acid at a temperature of about 0° to 50° C. in the presence of boron trifluoride.

References Cited in the file of this patent
UNITED STATES PATENTS
2,918,493    Panzer et al. _____ Dec. 22, 1959
FOREIGN PATENTS
814,360    Great Britain _____ June 3, 1959